(12) United States Patent
Johannsen et al.

(10) Patent No.: US 10,053,168 B2
(45) Date of Patent: Aug. 21, 2018

(54) TRACK PIN WITH IMPROVED HARDNESS PROFILE AND METHOD OF PRODUCING THE SAME

(71) Applicant: Caterpillar, Inc., Peoria, IL (US)

(72) Inventors: Eric James Johannsen, Washington, IL (US); Mircea Dumitru, Washington, IL (US); Chee Keong Ng, Dunlap, IL (US)

(73) Assignee: Caterpillar Inc., Deerfield, IL (US)

(*) Notice: Subject to any disclaimer, the term of this patent is extended or adjusted under 35 U.S.C. 154(b) by 143 days.

(21) Appl. No.: 14/949,935

(22) Filed: Nov. 24, 2015

(65) Prior Publication Data

US 2017/0144715 A1 May 25, 2017

(51) Int. Cl.
| | |
|---|---|
| *B62D 55/21* | (2006.01) |
| *B62D 55/20* | (2006.01) |
| *C21D 1/18* | (2006.01) |
| *C21D 9/28* | (2006.01) |
| *C21D 1/42* | (2006.01) |

(52) U.S. Cl.
CPC .......... *B62D 55/21* (2013.01); *B62D 55/20* (2013.01); *C21D 1/18* (2013.01); *C21D 1/42* (2013.01); *C21D 9/28* (2013.01); *C21D 2221/00* (2013.01)

(58) Field of Classification Search
CPC .. B62D 55/0887; B62D 55/21; B62D 55/205; F16C 11/045; C21D 9/28
See application file for complete search history.

(56) References Cited

U.S. PATENT DOCUMENTS

| | | | | |
|---|---|---|---|---|
| 4,629,353 A | * | 12/1986 | Burke | E02F 9/006 29/898.054 |
| 5,249,868 A | * | 10/1993 | Watts | B62D 55/205 148/570 |
| 6,045,200 A | * | 4/2000 | Anderton | B62D 55/08 305/104 |
| 6,089,683 A | * | 7/2000 | Anderton | B23P 15/00 305/101 |
| 6,402,862 B1 | * | 6/2002 | Anderton | B62D 55/21 148/570 |
| 7,657,990 B2 | * | 2/2010 | Wodrich | B62D 55/15 29/527.4 |
| 9,623,921 B2 | * | 4/2017 | Wodrich | B22D 19/08 |
| 2010/0252150 A1 | | 10/2010 | Xue | |
| 2014/0216613 A1 | | 8/2014 | Xue | |

FOREIGN PATENT DOCUMENTS

| | | |
|---|---|---|
| EP | 2224021 | 9/2010 |
| GB | 1572963 A | 8/1980 |
| JP | 0452247 | 2/1992 |
| JP | 1096010 | 4/1998 |

* cited by examiner

*Primary Examiner* — Jason R Bellinger
(74) *Attorney, Agent, or Firm* — Law Office of Kurt J. Fugman LLC

(57) ABSTRACT

A method of hardening an article of manufacture that includes a body that defines a longitudinal axis made of a material that is capable of being hardened and that is intended for a particular use includes locally heating the material at a first location found on the article along the axis to a first predetermined depth in a direction that is perpendicular to the axis and locally heating the material at a second location found on the article along the axis to a second predetermined depth in a direction that is perpendicular to the axis, wherein the first predetermined depth is different than the second predetermined depth.

15 Claims, 7 Drawing Sheets

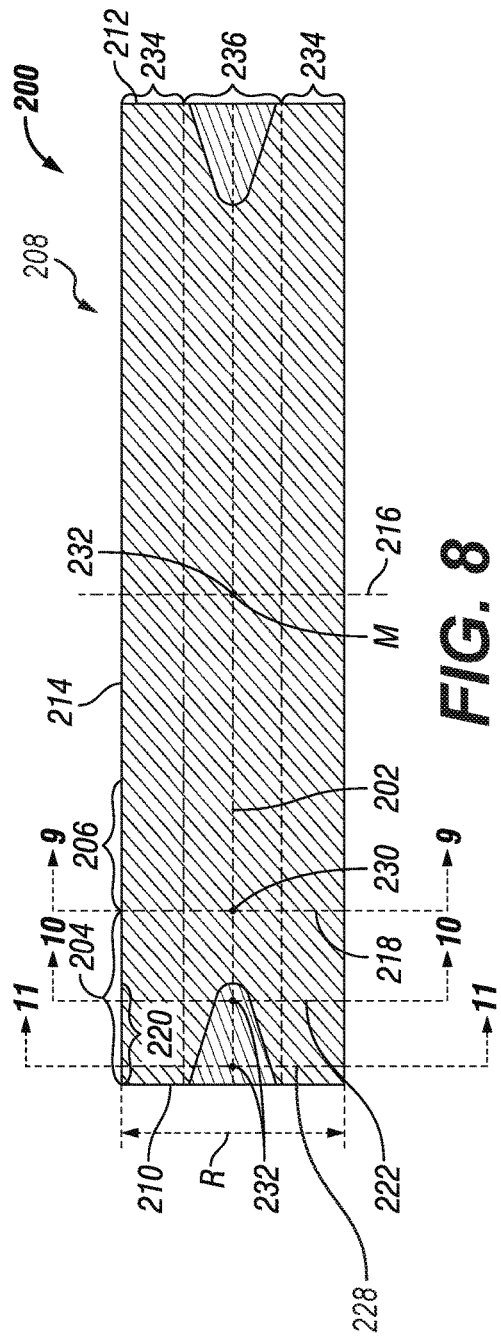

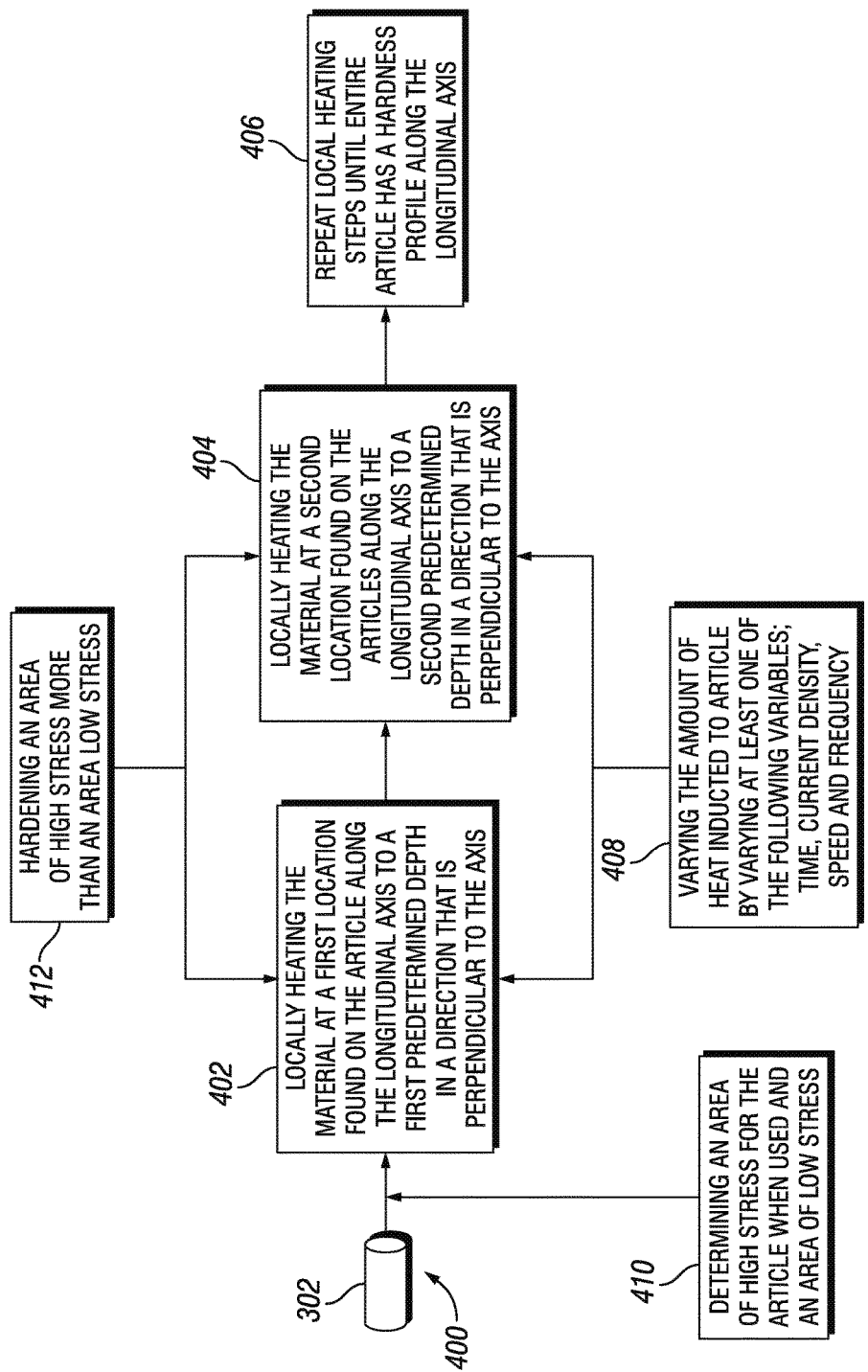

TRACK PIN WITH IMPROVED HARDNESS PROFILE AND METHOD OF PRODUCING THE SAME

TECHNICAL FIELD

The present disclosure relates to a track assembly for track-type vehicles used for off-road operations such as those that use endless tracks for moving on the ground. Specifically, the present disclosure relates to the track pin that is used to connect the track links together of endless tracks.

BACKGROUND

FIG. 1 illustrates a track-type tractor 100 employing a pair of endless track assemblies 102 (one shown) of this invention thereon. Although the track assembly is particularly adapted for use on a tractor, it should be understood that the track assembly will find application to other vehicles, such as track-type excavators or any other type of off-road vehicle or machinery. In the tractor application illustrated in FIG. 1, each track assembly 102 is mounted in a conventional manner on a drive sprocket 104, an idler 106, a plurality of longitudinally spaced track rollers 108, and a pair of upper guide or carrier rollers 110, when needed.

Referring to FIGS. 2 and 3, a track assembly 102 comprises a plurality of track shoes 112 which are pivotally interconnected by an articulated link assembly 114. Link assembly 114 is disposed intermediate the widths of track shoes 112 and includes a plurality of pairs of links 116, pivotally interconnected together by standard pin and bushing assemblies 118. The teeth 120 of drive sprocket 104 engage the bushings of pin and bushing assemblies 118 to drive track assembly 102 in a conventional manner with the track assemblies being guided by idler 106 and rollers 108 and 110 which engage upper rail portions of links 116. The main difference between the configurations of the track assembly of FIGS. 2 and 3 is that FIG. 2 is an inline configuration, so called as the drive sprocket is in-line with the front idler wheel forming a substantially ovular path for the track, while FIG. 3 shows an elevated configuration, so called as the drive sprocket is vertically above the lower idler wheels forming a substantially triangular path for the track.

With continued reference to FIGS. 2 and 3, the lower rollers are often called track rollers 108 as they support the weight of the vehicle and transfer it to the track and then to the ground while the upper rollers are often called carrier rollers 110 as they only carry or support the track, limiting or sometimes modifying the catenary hang of the track. The drive sprockets 104 have segments 122 with drive teeth 122 connected to them or integrally formed therewith that mesh with the links 116 in the track assembly 102, powering movement of the track, and thus the vehicle. The shoes 112 include provide movable platforms that engage the ground and include ribs or grousers 124 that penetrate the ground, providing traction. The idler wheels 106 lack teeth but ride between the links 116 (see G in FIG. 5) and on top of the rails (see 130 of FIG. 4) of the links 116, limiting side to side movement of the track. Similarly, the rollers 108, 110 provide a conduit for the transfer of weight, and in many cases, provide a way to adjust the tension in the track. The rollers 108, 110 also ride between the links 116 and on top of the rails of the links 116, limiting side to side movement of the track.

Turning now to FIGS. 4 and 5, they show an example of a link assembly 114 that includes a pair of track links 116 that are joined together by a track pin and bushing assembly 118 in a manner consistent with the tracks illustrated in FIGS. 2 and 3. The track pin and bushing assembly 118 form a joint that includes a cylindrical pin 126, and a rotatable tubular bushing 128. The pin 126 has opposite end portions 132 (best seen in FIG. 5), each of which is pressed and non-rotatably mounted into a respective one of the bore 134 formed by a protruding boss 136 of the outboard end collars 138 of each link 116 in a link set 114. The pin and bushing assembly 118 further includes a method and device for mechanically interlocking the pin 126 within such bores 134 to prevent any axial movement of the links 116 along a longitudinal or cylindrical axis 140 of the pin 126.

One type of method for mechanically interlocking the pin 14 to the links 16 is that apparatus disclosed and described in U.S. Pat. No. 4,618,190, entitled Track Joint Retaining Apparatus, issued Oct. 21, 1986, and which is incorporated hereinto by this reference. Another preferred mechanically interlocking method comprises a circumferentially disposed, generally arcuately shaped groove formed about each of the end portions of the pin and at least one mechanically formed nodule which protrudes radially inwardly from each of the bores into a respective one of the grooves. The mechanically formed nodules are preferably formed by using a punch device. Preferably, a pair of such punch devices are located perpendicular to the pin axis on each of the flats provided on the pin boss. The application of a sufficient force of the punch devices will result in the extrusion of the boss metal into the groove. This method is disclosed in U.S. Pat. No. 5,183,318, entitled Endless Track Chain for Track-Type Vehicles, issued Feb. 2, 1993, and which is incorporated herein by reference. Other methods for achieving this are also available and may be used.

Referring to FIG. 6, there is shown a portion of an undercarriage for a track-type machine that uses a track assembly 102 and link assembly 114 that are similar to those described thus far herein. The tubular bushing 128 is provided with a pin bore 142 which is of a size sufficient to freely rotatably mount the bushing 128 about the pin 126. Bushing 128 has a pair of opposite end faces 144 and is of a size to extend between and to freely rotatable relative to the inboard end collars 146.

As shown in FIG. 6, each link assembly includes inboard links 116 and outboard links 116'. Inboard links 116 and outboard links 116' may be coupled together with a plurality of additional inboard and outboard links (not shown), to form an endless chain extending about a conventional drive mechanism including one or more track idlers and a drive sprocket. This may be used in a variety of track-type machines, such as a track-type tractor, tracked excavator, tracked loader, or the like. As will be further apparent from the following description, one practical implementation of the teachings set forth herein is contemplated to be in track-type tractors used in particularly harsh field conditions, such as mines and landfills.

The track pin 126 may be press fit with outboard links 116'. In one embodiment, retention rings 148 or some other mechanism for positive pin retention may be coupled with pin 126 to enhance the strength of the coupling with outboard links 116'. In the embodiment shown, inboard links 116 and outboard links 116' include S-shaped links, however the present disclosure is not limited in this regard and straight link track might also be used. During operation as already discussed, one or more track idlers and a drive sprocket may engage with the bushing 128 to guide and provide power to the track in a conventional manner. As will be familiar to those skilled in the art, some structure for lubricating surfaces which move against one another within the track assembly may be desirable. To this end, the pin 126 may include an oil passage 150 which serves as an oil reservoir for supplying oil to desired locations within track segment.

During track assembly at the factory or during track repair or servicing, lubricating oil may be supplied into passage 150, and the oil passage may be plugged to seal the lubricating oil therein. A set of seals 152 may also be provided, which fluidly seal between outboard links 116' and bushing 128 to retain oil within the link assembly 114. The link assembly 114 also includes a set of thrust rings 154, each positioned between the bushing 128 and one of outboard links 116'. Thrust rings 154 can react to thrust loads through the link assembly 114, and may be configured to prevent compressive forces on seals 152 which can otherwise impart a tendency for seals to fail. Each of thrust rings 154 may be uniquely configured to provide a robust mechanism for reacting thrust loads, but also facilitate the transfer into and maintaining of oil within a region of the link assembly 114 defined between bushing 128 and outboard links 116', and also between each seal 152 and the pin 126. It should be noted that the oil passage is shown in dotted lines, indicating that in certain embodiments, it may not be present, such as will now be described.

FIG. 7 shows another track link assembly 114 that is known in the art that lacks an oil passage or other void that surrounds the longitudinal axis of the pin. This link assembly 114 includes a seal assembly 156 that includes first and second seal members 158, 160 that provide sealing between the inboard end collars 146 of the outboard link 116' and the bushing 128. Each of the seal assembly 156 is disposed within each of the counterbores 162 between the shoulder 164 of the counterbore and the adjacent outer end face 144 of the bushing 128 and in sealing engagement against the outer end face 144. These type of seals are often referred to as rotating face seals as they allow the bushing to rotate relative to the pin 126 and outboard link while still keeping lubrication from leaking. Also, thrust rings are provided between the pin and seal assembly for reasons already explained above. The pin includes regions that absorb loads from the links either directly or indirectly through the bushing. Specifically, region 166 is in contact with the outboard link 116' while region 168 is in contact with the bushing 128 directly underneath the inboard link 116.

As can be imagined, the track pin of any of the embodiments discussed herein supports a heavy load during use and any failure of the track pin also results in a failure of the track of the vehicle, causing an undesirable down time for that vehicle. As a result, track pins are usually hardened to improve their durability in the field. However, hardening such track pins can be very costly.

Accordingly, it is desirable to reduce the cost of track pin manufacture without compromising the durability of the track pin in the field.

SUMMARY

A track pin for use with a track assembly of a vehicle is provided. The track pin comprises a body of material that defines a perimeter surface, a first end, a second end and a longitudinal axis that extends from the first end to the second end. The body also defines a cross-section that is taken through the longitudinal axis and that is parallel with the longitudinal axis from the first end to the second end. The body includes an outer region that spans from the perimeter surface to a depth along a direction that is perpendicular to the longitudinal axis and an inner region that spans from the outer region toward the longitudinal axis in a direction that is perpendicular to the axis. A gradient of hardness of the material exists in the inner region from a first location taken along an axis that is parallel to the longitudinal axis to a second location that is taken along the axis that is parallel to the longitudinal axis.

A track assembly for use with a vehicle is provided that includes a plurality of track links and a plurality of track pins. At least one track pin comprises a body of material that defines a first end, a second end and a longitudinal axis that extends from the first end to the second end. The body may also define a perimeter surface that includes a portion that is configured to absorb a load from a first track link and a portion that is configured to absorb a load from a second track link. The first portion and the second portion may be immediately adjacent each other along the axis, forming an interface and the hardness of the material at the interface is substantially the same throughout a cross-section taken at this interface that is perpendicular to this axis. The body may further define a third portion that is spaced away from the interface along the axis, wherein a cross-section taken along the longitudinal axis that is adjacent the third portion along the axis includes a gradient of hardness in a direction that is perpendicular to the axis.

A method of hardening an article of manufacture that includes a body that defines a longitudinal axis made of a material that is capable of being hardened and that is intended for a particular use is provided. The method may comprise locally heating the material at a first location found on the article along the axis to a first predetermined depth in a direction that is perpendicular to the axis and locally heating the material at a second location found on the article along the axis to a second predetermined depth in a direction that is perpendicular to the axis, wherein the first predetermined depth is different than the second predetermined depth.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 8 is a sectional view of a track pin similar to that shown in FIG. 7, depicting an improved hardness profile along it cylindrical axis.

FIG. 9 is sectional view taken along lines 9-9 of FIG. 8, showing a region of high strength created by locally through hardening the pin.

FIG. 10 is a sectional view take along lines 10-10 of FIG. 8, showing a region of lower strength than that shown in FIG. 9 due to a soft core that is beginning to develop along the cylindrical axis.

FIG. 11 is a sectional view take along lines 11-11 of FIG. 8, showing a region of lower strength than that shown in FIG. 10 due to the enlargement of the soft core found along the axis.

FIG. 13 is a flowchart showing a method for hardening the pin of FIGS. 8 thru 11.

DETAILED DESCRIPTION

Figure 1:
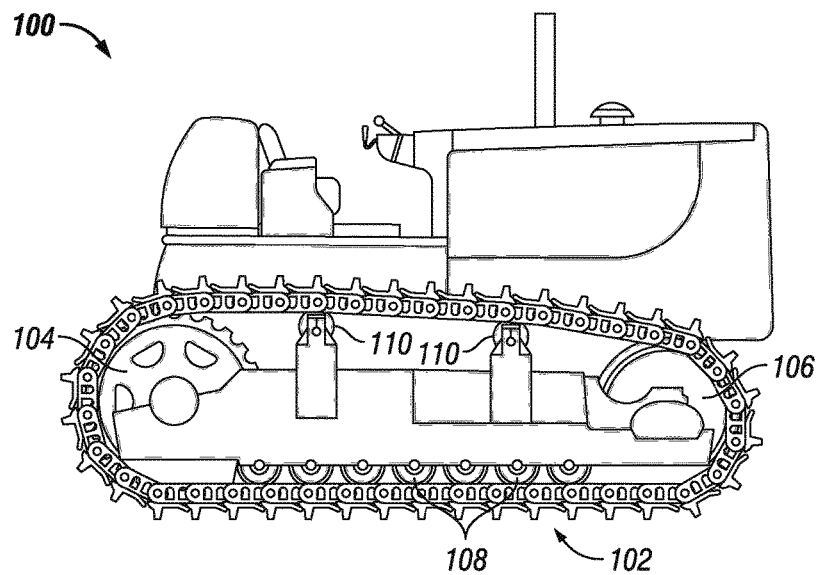
FIG. 1 is a front view of a tractor that uses an endless track for mobility as is known in the art.
Figure 2:
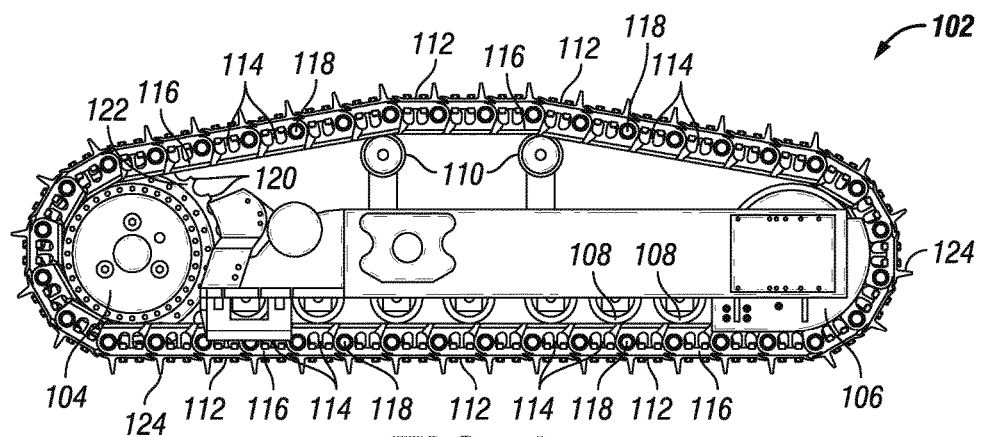
FIG. 2 is a front view of an endless track that is similar to that disclosed in FIG. 1 but is isolated from the tractor, illustrating more clearly an in-line configuration of endless track.
Figure 3:
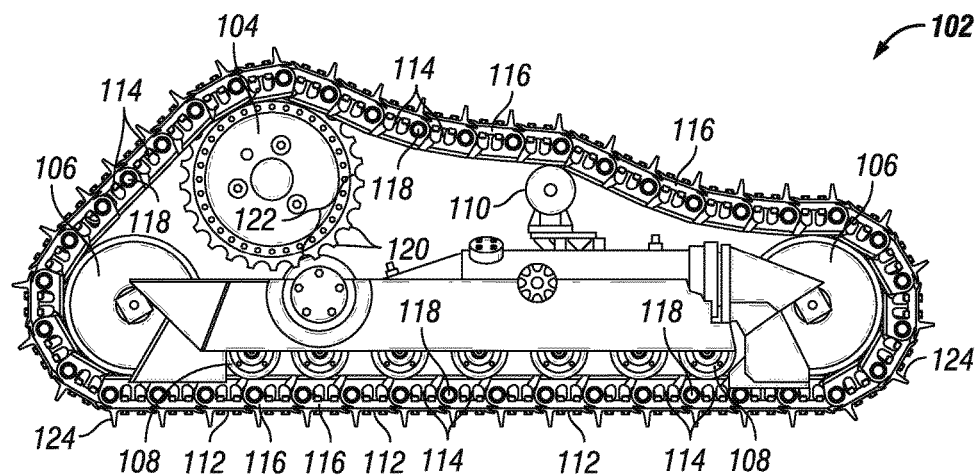
FIG. 3 is a front view of an endless track similar to that shown in FIG. 2 except that is uses an elevated drive sprocket.
Figure 4:
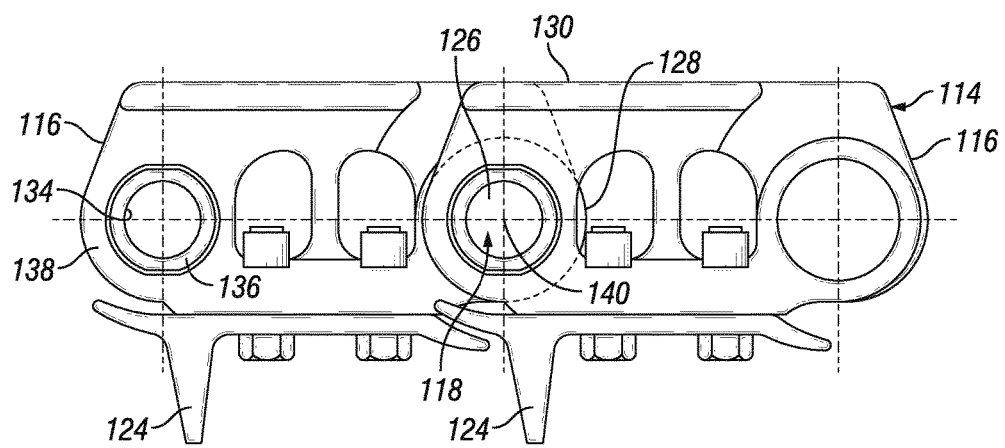
FIG. 4 is an enlarged front view of a pair of track links that are joined together by a track pin and bushing in a manner that is similar to the tracks illustrated in FIGS. 2 and 3.
Figure 5:
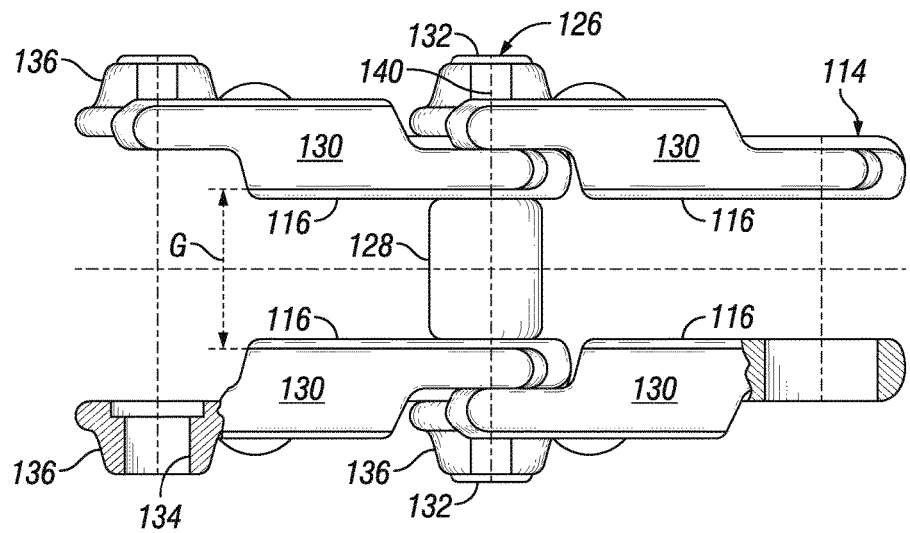
FIG. 5 is a top view of the track links, bushing and track pin of FIG. 4. The track shoes are removed for extra clarity.
Figure 6:
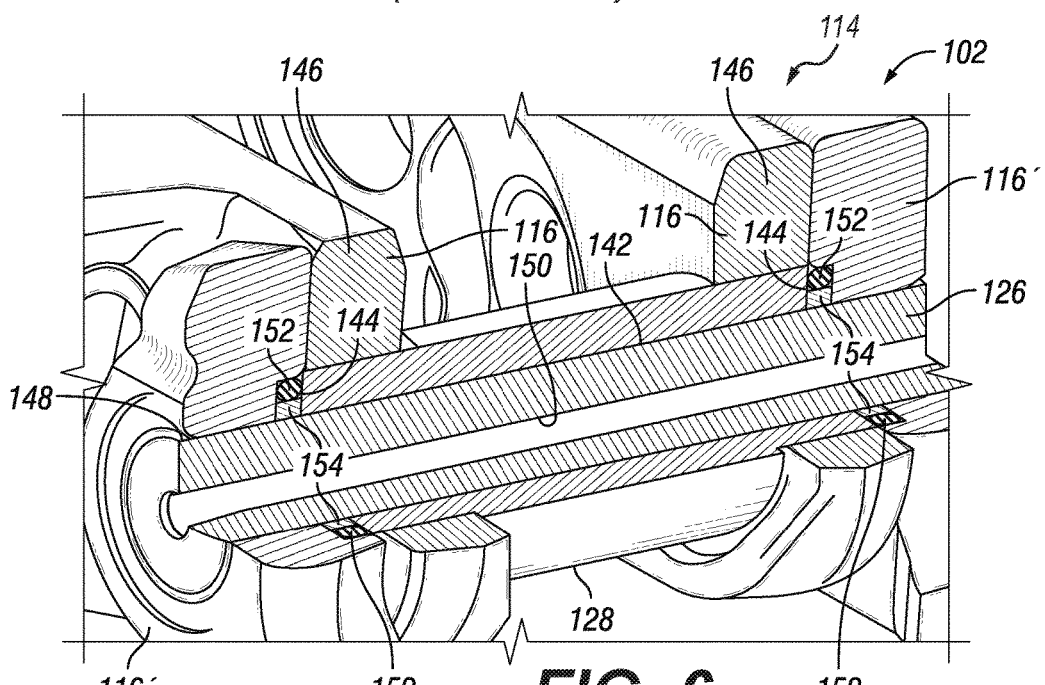
FIG. 6 is a perspective sectional view of track links, a bushing and track pin that is similar to that shown in FIG. 5.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Embodiments of the track pin with an improved hardness profile that will be discussed may be used with any link or track assembly specifically discussed herein, is otherwise known in the art, or that will be devised in the art. Furthermore, the embodiments include any article of manufacture that defines a longitudinal axis, so called as it extends generally along the dimension of greatest extent, and that has a perimeter or perimeter surface that is intended to take or absorb one or more loads, creating a varying stress profile along the longitudinal axis.

Figure 7:
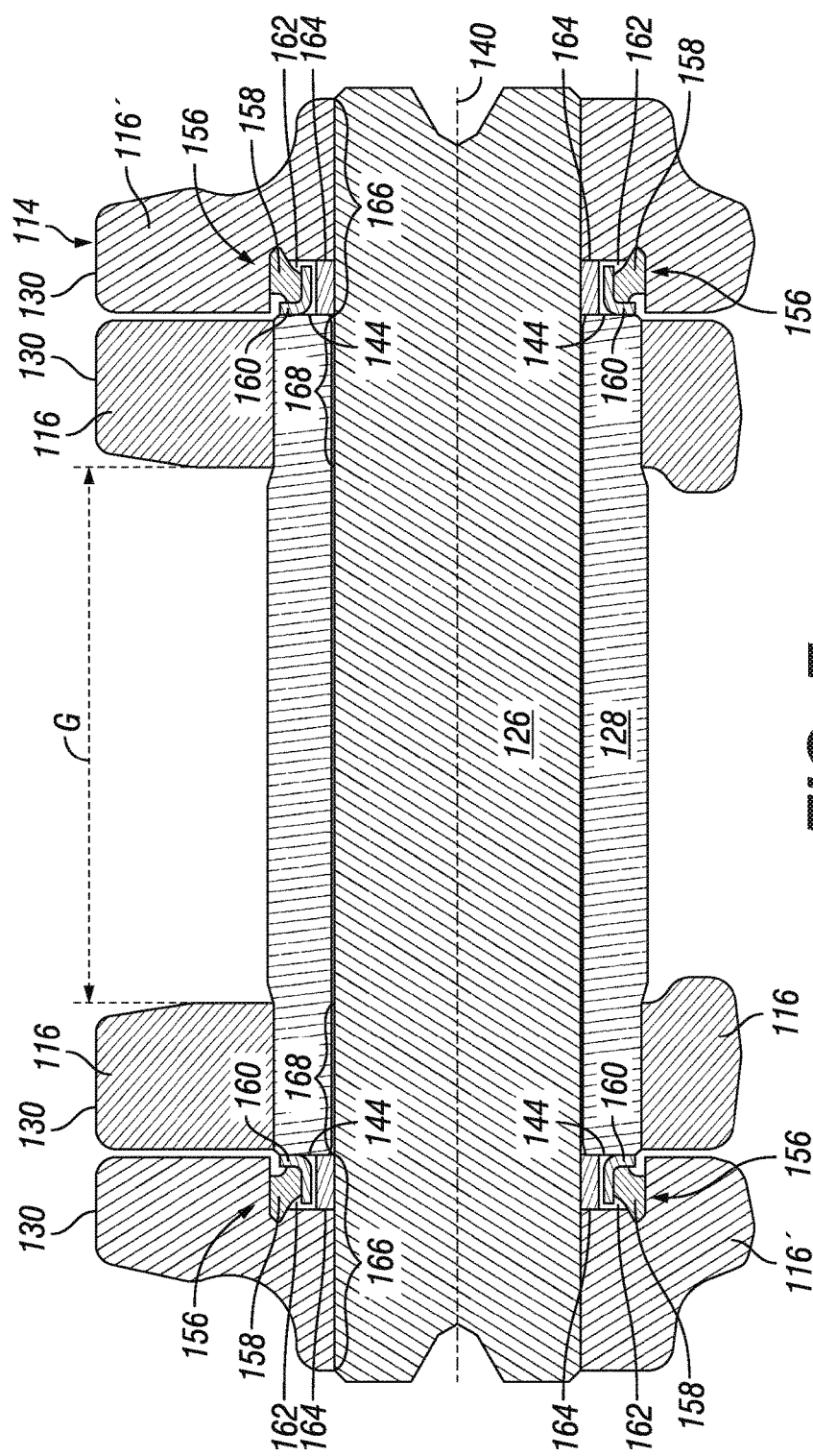
FIG. 7 is a plan sectional view of track links, bushing and track pin similar to that shown in FIG. 5, where the track pin is of solid construction, lacking a central oil groove that runs along its cylindrical axis.

FIG. 8 shows a cylindrically configured track pin 200 that defines a cylindrical axis 202 that has different regions 204, 206 that absorb loads from inboard and outboard links in a manner similar to what was described above with reference to FIG. 7. The track pin 200 includes a body 208 of material that defines a first end 210 and a second end 212 that are at opposite sides of the longitudinal axis 202. The body 208 further defines an outer perimeter or perimeter surface 214 that includes a portion or region 204 that is configured to absorb a load from a first track link, for example the outboard link, and a second portion or region 206 that is configured to absorb a load from a second track link, for example an inboard link. For simplicity, only half the pin from a plane of symmetry 216 that is located along the longitudinal axis at its midpoint M to the left in FIG. 8 will be discussed, knowing that the construction and loading of the pin is symmetrical about this plane. In some embodiments, the construction and loading may not be symmetrical about this plane.

The inventors have identified that at the place where the first portion 204 and second portion 206 meet, that is to say that they are immediately adjacent each other along the axis 202, an interface plane 218 is formed. Since the link and track assemblies are often in tension, adjacent links pull in opposite directions, creating a shear stress in this plane 218. This is a place prone to cracking or failure in the field. Accordingly, the inventors have found it useful to have a high hardness of the material at the interface that is substantially the same throughout a cross-section taken at this interface that is perpendicular to the axis 202. This may be in the range that is greater than 35 Rockwell C scale, and preferably 55-62 Rockwell C scale, especially near the perimeter surface. The homogeneous properties of this plane is illustrated by FIG. 9 where the consistent cross-hatching indicates a region of high hardness.

The body defines a third portion 220 that is spaced away from the interface plane along the axis 202. A cross-section 222 taken here that is perpendicular to the axis and that is adjacent the third portion 220 along the axis includes a gradient of hardness in a direction that is perpendicular to the axis. The heterogeneous properties of this cross-section is depicted by FIG. 10, where the high hardness region 224, which is closer to the perimeter surface 214, having a first cross-hatching contains high hardness material while the lower hardness region 226, which is closer to the longitudinal axis 202, having a different cross-hatching contains a low hardness material.

The introduction of a soft core is allowable since it is located far enough away from the shear plane that the stresses are sufficiently reduced to allow for the use of a softer material and less heat treating. This in turn reduces the cost of manufacturing the pin as will be described in more detail later herein without significantly increasing the likelihood of failure in the field. Another such cross-section 228 of the third portion 220 is depicted by FIG. 11. The hardness of the softer material may be in the range of greater than 20 Rockwell C scale, and preferably in the range of 30-50 Rockwell C scale. In some cases, soft regions of the pin may be even softer such as on the Rockwell B scale. For example, these areas could be unhardened raw stock.

This construction of a pin may be used as often as needed, such as in every pin and bushing assembly in a track assembly or only one of such pin and bushing assemblies, or any other number. Similarly, track assemblies that use this construction may have one or more bushings, one or more shoes, one or more thrust rings, and one or more seals. Often, track assemblies are sold without certain components such as shoes, etc. so embodiments of the present disclosure include those that merely have links and pins.

FIG. 8 depicts a cross-section taken through the longitudinal axis 202 and that is parallel with the longitudinal axis 202 from the first end 210 to the second end 212. Since the cross-section is of a cylinder for this embodiment of the track pin, the cross-section is also coincident with the radial direction R of the pin. A gradient of hardness of the material exists from a first location 230 taken along the axis 202 to a second location 232 taken along the axis 202. Any of these cross-sections may be taken at the locations depicted by FIGS. 9 thru 11 or may be taken elsewhere such as at the midpoint M. When making this comparison, the points at which the hardness is measured may be taken at a first location and a second location that are found directly on the longitudinal axis 202, or they may be taken along another axis that is spaced away from the longitudinal axis but that is parallel thereto. For certain locations such as those depicted by FIG. 10 or 11 or that would be present at the midpoint M, the hardness of the body taken at those locations is less than the hardness of the body taken at the location corresponding to FIG. 9.

FIG. 8 also shows that the body 208 includes an outer region 234 that spans from the perimeter surface 214 to a depth along the radial direction R and an inner region 236 that spans from the outer region toward the longitudinal axis along the radial direction R. In this embodiment, the outer region comprises material that has a substantially consistent hardness along the entire length of the longitudinal axis. There may be a gradient in other embodiments. While the track pin of FIG. 8 does not have any void therein for the conveyance of lubricant, it is contemplated that other embodiments of the track pin may have a body that defines at least one void that surrounds the longitudinal axis that is contained within the inner region.

Since the construction of the pin 202 is symmetrical about the mid-plane 216, the hardness of the body 208 taken at the first end 210 and the second end 212 on the longitudinal axis 202 is substantially the same. Also, the hardness at the midpoint M is substantially the same as the hardness of the first and second ends. Again, having a low hardness in these areas is permissible since it is not near an area of high stress. Any varying hardness profile along the longitudinal axis or other axis parallel thereto may be used with any embodiment of the pin discussed herein.

FIG. 9 shows a location positioned between the first end 210 and midpoint M on the longitudinal axis 202 that includes material having a hardness that is greater than the material of the ends 210, 212 and midpoint M of the body 208 on the longitudinal axis 202. Other locations may have a similar difference in hardness as compared to the ends and midpoint. In some embodiments, the body defines at least two successive cross-sections spaced along the longitudinal axis 202 that are perpendicular to the longitudinal axis (such as extending in the radial R direction) wherein each cross-section defines a gradient of the hardness of the material along a direction (R) that is perpendicular to the longitudinal axis that is different from each other. For example, FIGS. 9 through 11 illustrate such a gradient along the radial direction R of the cylindrical pin. In other words, the hardness varies a different amount along the radial direction R in FIG. 9 as compared to FIG. 10 and as compared to FIG. 11, etc.

Focusing on FIGS. 10 and 11, each shows a cross-section where the gradient comprises a first region 224 having a first substantially consistent hardness and a second region 226 having a second substantially consistent hardness, wherein the first and second hardness are different from each other. It should be noted that in reality a complete step change between hardness of adjacent regions is not perfect and that a very small zone of transition of varying hardness may exist. However, in most cases this transition zone is sufficiently small as to be disregarded. Also oil grooves that exist are not to be considered when determining if a gradient of hardness exists. As can be seen, the cross-sections of FIGS. 10 and 11 are examples of two successive cross-sections that are positioned adjacent an end 210 of the body 208 of the pin 200.

INDUSTRIAL APPLICABILITY

A method of hardening an article of manufacture that includes a body that defines a longitudinal axis and that is made of a material that is capable of being hardened and that is intended for a particular use will be described. It should be noted that a track pin is only one example of such an article of manufacture. The article of manufacture may be provided as well as a hardening instrument. The hardening instrument may take many forms such as a laser, electron beam, plasma torch or high induction frequency apparatus. It should be noted that any "providing" steps referred to herein include situations where one or more components are manufactured (see step 400 of FIG. 13), sold, bought, already present in the field, etc.

Figure 12:
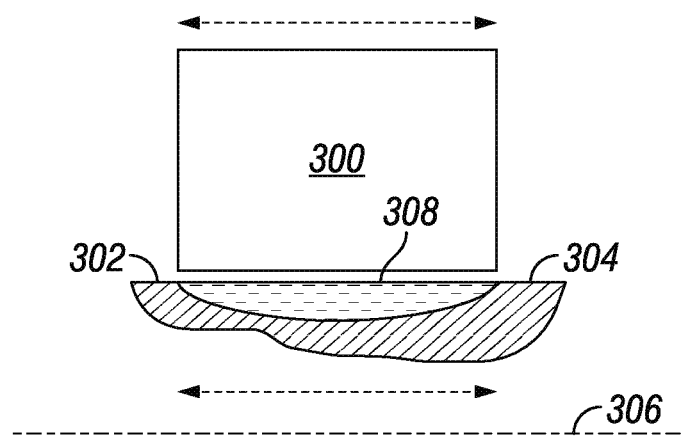
FIG. 12 illustrates the use of local heating to create a hardness profile such as that shown in FIGS. 8 thru 11.

Looking now at FIG. 12, a hardening instrument in the form of a high frequency induction apparatus 300 is positioned along the outer perimeter 304 of an article of manufacture such as a track pin 302 and is moved along its longitudinal axis 306 (or vice versa), conveying heat that raises the temperature locally until some amount 308 of the material reaches a transformation temperature, which leads to a harder material. This apparatus is used to perform the following method.

The method comprises the steps of locally heating the material at a first location found on the article along the axis until some portion of the material reaches a transformation temperature; and locally heating the material at a second location found on the article along the axis until some portion of the material reaches a transformation temperature, wherein the amount of material that reaches the transformation temperature at the first location is different than the amount of material that reaches the transformation temperature at the second location.

Put into other words, the first step could be locally heating the material at a first location found on the article along the longitudinal axis to a first predetermined depth in a direction that is perpendicular to the longitudinal axis (see step 402 of FIG. 13) and the second step could be locally heating the material at a second location found on the article along the longitudinal axis to a second predetermined depth in a direction that is perpendicular to the longitudinal axis (see step 404), wherein the first depth is different than the second depth but both depths are more than zero. In many cases, the locations are immediately adjacent each other and are followed by other local heating steps in a continuous fashion from one end of the article to the other (see step 406). This may not be true for other embodiments.

While these steps may use high frequency induction, other methods and apparatus may be used as has just been described. These steps that result in a different amount of material reaching the transformation temperature may involve the step of varying the amount of heat inducted to the article by varying at least one of the following variables: time, current density, speed and frequency (see step 408).

In some embodiments, the speed at which the induction apparatus moves along the axis does not vary but one of the other variables such as frequency and current density are varied. In other cases, the time spent at one location is varied while the other variables remain constant, etc.

The method may also include determining an area of high stress for the article when used and an area of low stress for the article when used (step 410) and hardening the area of high stress more than the area of low stress (step 412). This optimizes the performance of the article when it is used as intended while minimizing the time and cost of hardening.

A specific example of this method is one where the pin passes through an inductor, or vice versa, at a speed that ranges from 2 mm/s to 20 mm/s and the frequency of the inductor may vary from 0.5 to 5 kHz. These parameters will need to be varied depending on what the various desired hardness is, on the size of the pin or other article of manufacture, and the type of steel or other material used. Of course, the parameters will change as the pin moves through the inductor as previously explained.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track pin for use with a track assembly of a vehicle, the track pin comprising:
    a body of material that defines a perimeter surface, a first end, a second end and a longitudinal axis that extends from the first end to the second end, the body defining a cross-section that is taken through the longitudinal axis and that is parallel with the longitudinal axis from the first end to the second end;
    wherein the body includes an outer region that spans from the perimeter surface to a depth along a direction perpendicular to the longitudinal axis and an inner region that spans from the outer region toward the longitudinal axis in a direction that is perpendicular to the axis, and
    wherein a gradient of hardness of the material exists in the inner region from a first location taken along the an axis that is parallel to the longitudinal axis to a second location that is taken along the axis that is parallel to the longitudinal axis.

2. The track pin of claim 1 wherein the body includes a substantially cylindrical shape and the longitudinal axis is a cylindrical axis.

3. The track pin of claim 1 wherein the first and second locations are taken directly on the longitudinal axis.

4. The track pin of claim 1 wherein the outer region comprises material that has a substantially consistent hardness along the entire length of the longitudinal axis.

5. The track pin of claim 1 wherein hardness of the body taken at the first end and the second end on the longitudinal axis is substantially the same.

6. The track pin of claim 5 wherein the body defines a midpoint on the longitudinal axis and the hardness at the midpoint is substantially the same as the hardness of the first and second ends.

7. The track pin of claim 6 wherein a location positioned between either the first end and midpoint or the second end and midpoint on the longitudinal axis includes material having a hardness that is greater than the material of the ends and midpoint of the body.

8. The track pin of claim 1 wherein the body defines at least two successive cross-sections spaced along the longitudinal axis that are perpendicular to the longitudinal axis wherein each cross-section defines a gradient of the hardness of the material along a direction that is perpendicular to the longitudinal axis that is different from each other.

9. The track pin of claim 8 wherein the gradient in the cross-section that is perpendicular to the longitudinal axis comprises the outer region that has a first substantially consistent hardness and the inner region that has a second substantially consistent hardness, wherein the first and second hardness are different from each other.

10. The track pin of claim 9 wherein the two successive cross-sections are positioned adjacent an end of the body of the pin.

11. A track assembly for use with a vehicle comprising:
    a plurality of track links; and
    a plurality of track pins wherein at least one track pin comprises:
        a body of material that defines a first end, a second end, a longitudinal axis that extends from the first end to the second end, the body defining a perimeter surface that includes a portion that is configured to absorb a load from a first track link and a portion that is configured to absorb a load from a second track link;
    wherein the first portion and second portion are immediately adjacent each other along the axis, forming an interface and the hardness of the material at the interface is substantially the same throughout a cross-section taken at this interface that is perpendicular to the axis; and
    wherein the body defines a third portion that is spaced away from the interface along the axis, wherein a cross-section taken along the longitudinal axis that is perpendicular to the axis that is adjacent the third portion along the axis includes a gradient of hardness in a direction that is perpendicular to the axis.

12. The track assembly of claim 11 wherein every track pin comprises:
    a body of material that defines a first end, a second end, a longitudinal axis that extends from the first end to the second end, the body defining a perimeter surface that includes a portion that is configured to absorb a load from a first track link and a portion that is configured to absorb a load from a second track link;
    wherein the first portion and second portion are immediately adjacent each other along the axis, forming an interface and the hardness of the material at the interface is substantially the same throughout a cross-section taken at this interface that is perpendicular to the axis; and
    wherein the body defines a third portion that is spaced away from the interface along the axis, wherein a cross-section taken along the longitudinal axis that is perpendicular to the axis that is adjacent the third portion along the axis includes a gradient of hardness in a direction that is perpendicular to the axis.

13. The track assembly of claim 11 further comprising a plurality of bushings.

14. The track assembly of claim 11 further comprising a plurality of shoes.

15. The track assembly of claim 11 further comprising a plurality of thrust rings and a plurality of seals.

* * * * *